(12) United States Patent
Sharma

(10) Patent No.: US 9,117,197 B1
(45) Date of Patent: Aug. 25, 2015

(54) ALERT SYSTEM FOR SOCIAL NETWORK USERS

(71) Applicant: Google Inc., Mountain View, CA (US)

(72) Inventor: Sonia Sharma, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 13/655,554

(22) Filed: Oct. 19, 2012

(51) Int. Cl.
*G06F 15/16* (2006.01)
*G06Q 10/10* (2012.01)
*H04L 29/06* (2006.01)

(52) U.S. Cl.
CPC .............. *G06Q 10/10* (2013.01); *H04L 29/06* (2013.01)

(58) Field of Classification Search
USPC .......................... 709/204, 205, 206, 207, 224
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,539,942 B1 * | 5/2009 | Appelman | 715/733 |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,417,662 B2 * | 4/2013 | Gawlick | 706/59 |
| 8,781,847 B2 * | 7/2014 | Simms et al. | 705/2 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0004984 A1 * | 1/2005 | Simpson | 709/205 |
| 2005/0152521 A1 | 7/2005 | Liljestrand | |
| 2005/0246421 A1 * | 11/2005 | Moore et al. | 709/204 |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |

(Continued)

FOREIGN PATENT DOCUMENTS

| | | |
|---|---|---|
| WO | WO02079984 | 10/2002 |
| WO | WO 2009070708 A2 * | 6/2009 |

(Continued)

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Kostas Katsikis
(74) *Attorney, Agent, or Firm* — Patent Law Works LLP

(57) ABSTRACT

A system includes: a rule module, an application programming interface module, a determination module and a communication module. The rule module receives an alert rule describing a second user and a social network application associated with the second user. The rule module stores the alert rule in a user profile for the first user. The application programming interface module determines an application programming interface. The determination module receives a presence update from the social network application. The determination module determines whether the second user may be active on the social network application. The determination module determines an alert event responsive to determining that the second user may be active on the social network application. The communication module transmits an alert message to the first user responsive to the alert event.

20 Claims, 7 Drawing Sheets

(56) References Cited

U.S. PATENT DOCUMENTS

| | | | |
|---|---|---|---|
| 2007/0127631 A1 | 6/2007 | Difiglia | |
| 2007/0150479 A1* | 6/2007 | Issa et al. | 707/10 |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0168138 A1* | 7/2008 | Simpson | 709/204 |
| 2008/0192656 A1 | 8/2008 | Vagelos | |
| 2009/0327432 A1* | 12/2009 | Augustine et al. | 709/206 |
| 2009/0327437 A1* | 12/2009 | Estrada | 709/206 |
| 2011/0026704 A1* | 2/2011 | Connelly et al. | 379/219 |
| 2011/0087732 A1* | 4/2011 | Lakshmanan et al. | 709/204 |
| 2011/0098156 A1 | 4/2011 | Ng et al. | |
| 2011/0288868 A1* | 11/2011 | Lloyd et al. | 704/251 |
| 2012/0030286 A1* | 2/2012 | Tiu et al. | 709/204 |
| 2012/0158751 A1* | 6/2012 | Tseng | 707/751 |
| 2013/0031190 A1* | 1/2013 | Chan et al. | 709/206 |
| 2013/0204940 A1* | 8/2013 | Kinsel et al. | 709/204 |
| 2013/0297711 A1* | 11/2013 | Nhu | 709/206 |

FOREIGN PATENT DOCUMENTS

| | | | |
|---|---|---|---|
| WO | WO 2010002747 A2 * | 1/2010 | |
| WO | WO 2011121542 A1 * | 10/2011 | |

OTHER PUBLICATIONS

Agarwal et al., "Enabling Real-Time User Interests for Next Generation Activity-Oriented Social Networks," Thesis submited to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

ALERT SYSTEM FOR SOCIAL NETWORK USERS

BACKGROUND

The specification relates to providing an alert to a first user when a second user may be active on a social network application.

The popularity of electronic communications, in particular, via online communities or services, for example, social networks, has grown over the years. Some social networks provide real-time chat services, e.g., instant messaging, video conferencing and voice chat, for communication over the Internet between at least two members of the social network. However, each party is required to be online or logged-in to the social network at the same time to communicate using the chat service. Each party may have different schedules when they login to or use the social network. Therefore, the parties miss opportunities to chat with each other. One party may login to the social network and wait for the other party to login to the social network. However, the waiting party wastes time and computer network resources as a result of waiting for the other party to login to the social network.

SUMMARY

In general, one innovative aspect of the subject matter described in this disclosure may be embodied in methods that include: receiving an alert rule from a first user describing a second user and a social network application associated with the second user; storing the alert rule in a user profile for the first user; determining an application programming interface based on the alert rule; receiving a presence update from the social network application based on the application programming interface, the presence update describing whether the second user may be active on the social network application; determining whether the second user may be active on the social network application; determining an alert event responsive to determining that the second user may be active on the social network application; and transmitting an alert message to the first user responsive to the alert event.

Other aspects include corresponding methods, systems, apparatus, and computer program products for these and other innovative aspects.

These and other implementations may each optionally include one or more of the following features. For instance, the operations include: determining whether a login event may be configured based on the alert rule; retrieving login information for the first user; and logging the first user in the social network application responsive to the alert event. For instance, the features include: the alert rule being for a group in the social network and the second user is part of the group; the alert rule describes two or more second users and two or more alert types associated with the two or more second users; the alert types may be different for each second user; the alert rule describes the social network application and the user profile may be associated with a different social network application; and determining whether the second user is active is based on the second user performing an activity in the social network during a fixed period of time.

The technology may be particularly advantageous in a number of respects. The system allows a user to configure an alert rule that specifies alerting the user when a second user may be active on a social network application. The user may configure different alert types for different second users. The user may also configure the alert rule for different second users on different social networks. By configuring the alert rule, the user does not need to unnecessarily wait for a second user specified by the alert rule to login to the social network application. Therefore, time and computer network resources may be saved as a result of configuring the alert rule.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
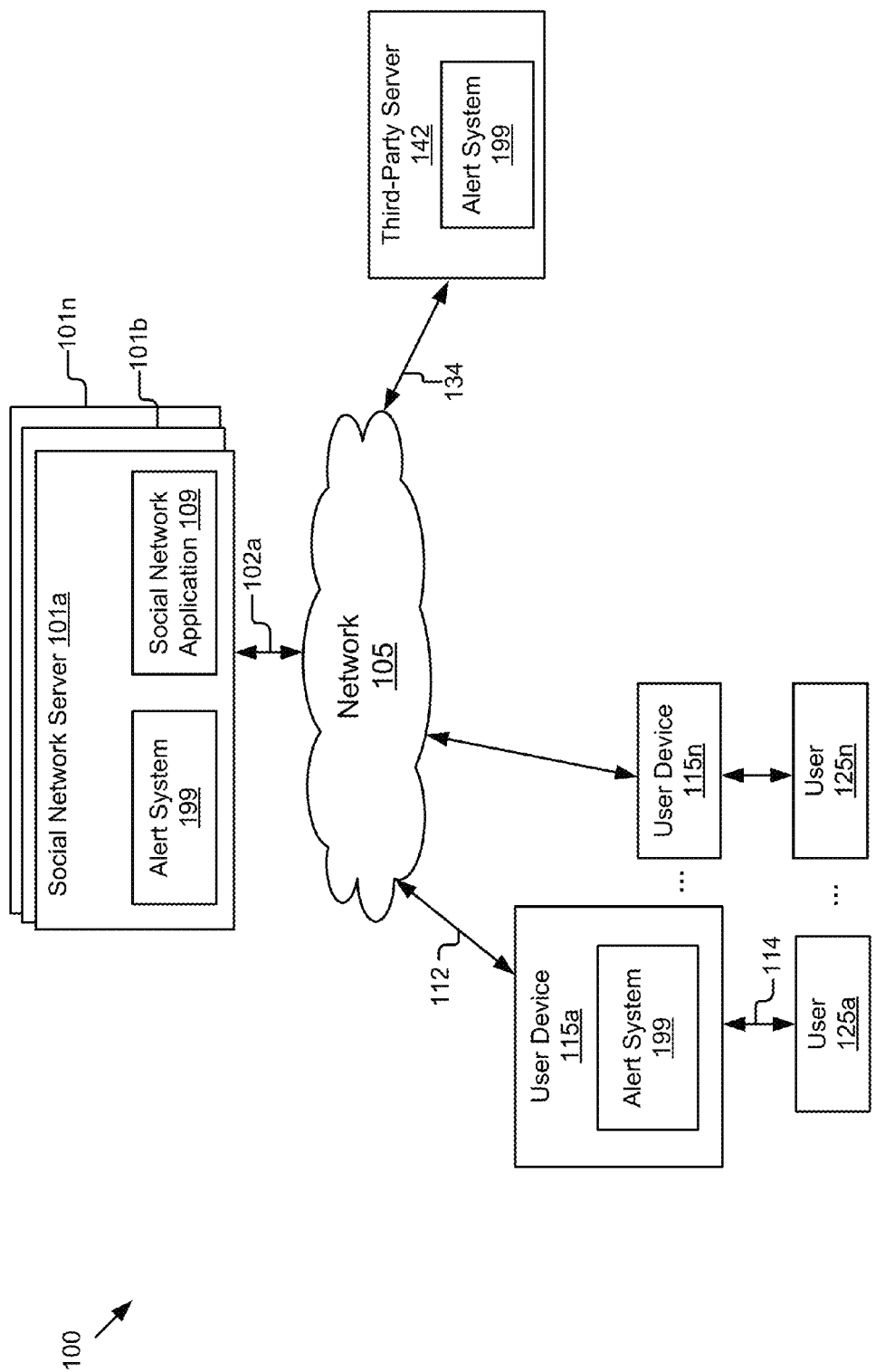
FIG. 1 is a block diagram illustrating an example system for providing an alert system.

FIG. 1 is a block diagram illustrating a system 100 for providing an alert system. The illustrated system 100 includes user devices 115a . . . 115n that can be accessed by users 125a . . . 125n, one or more social network servers 101a, 101b . . . 101n and a third-party server 142. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated implementation, these entities of the system 100 are communicatively coupled via a network 105.

In some instances, the alert system 199 may be operable on the social network server 101a, which is coupled to the network 105 via signal line 102a. The social network server 101a can be a hardware server that includes a processor, a memory and network communication capabilities. In some implementations, the social network server 101a sends and receives data to and from one or more of the user devices 115a . . . 115n, the social network servers 101b . . . 101n and the third-party server 142 via the network 105. The social network server 101a includes a social network application 109. The social network application 109 stores explicitly defined relationships and relationships implied by social connections with other online users as a social graph. In some examples, the social graph can reflect a mapping of these users and how they can be related. For example, when user A follows user B, user A has a first-degree relationship with user B. When user B follows user C, and user A does not follow user C, user A has a second-degree relationship with user C. In some instances, the social network application 109 generates groups of followers, for example, based on a particular interest (e.g. a group of photographers), a work relationship, a family relationship, etc. In some instances, users can specify a level of closeness to other users, for example, acquaintance, work friend, best friend, etc. In some instances, the social network application 109 generates an affinity score between users based on the degree of separation, frequency of communication between the users (comments, indications of acknowledgement, direct messaging, etc.) and level of closeness.

Furthermore, it should be understood that social network server 101a and social network application 109 are representative of one social network and that there are multiple social networks 101b . . . 101n coupled to the network 105, each having its own server, application and social graph. For example, a first social network can be directed to business networking, a second social network can be centered on academics, a third social network can be directed to dating, etc.

The user devices 115a . . . 115n in FIG. 1 are used by way of example. While FIG. 1 illustrates two user devices 115a . . . 115n, the disclosure applies to any system architecture having one or more user devices 115a . . . 115n. Furthermore, while only one network 105 is coupled to the user devices 115, the social network servers 101a, 101b . . . 101n and the third-party server 142, in practice any number of networks 105 can be connected to the entities.

In some instances, at least a part of the alert system 199 may be stored on a user device 115a, which is connected to the network 105 via signal line 112. For example, the alert system 199 can be a thin-client application that retrieves information from the social network application 109 on the social network server 101a. In another example, user device 115a may include a browser application (not shown). The alert system 199 may be extensible code stored and executed by the browser application. For example, the alert system 199 may be stored in a cache of the browser application (not pictured). A processor of the user device 115 (not pictured) may execute the alert system 199. The alert system 199 may be a plug-in to the browser application or extension code that cooperates with the browser application. The user 125a interacts with the user device 115a via signal line 114. The user device 115a . . . 115n is any computing device. For example, the user device 115a . . . 115n can be a personal computer ("PC"), a cell phone (e.g., a smart phone, a feature phone, etc.), a tablet computer (or tablet PC), a laptop, etc. In some instances, the user device 115a . . . 115n is a smart phone having a touch screen and the user 125a . . . 125n interacts with the smart phone via the touch screen. For example, mobile device includes a processor for executing the alert system 199 and the alert system 199 is an application stored in a memory of the mobile device.

In some instances, at least part of the alert system 199 may be stored on a third-party server 142, which is connected to the network 105 via signal line 134. In some implementations, the third-party server 142 can be a hardware server that includes a processor, a memory and network communication capabilities. The third-party server 142 sends and receives data to and from other entities of the system 100 via the network 105. While FIG. 1 includes one third-party server 142, the system 100 may include one or more third-party servers 142.

The network 105 can be a conventional type, wired or wireless, and may have any number of configurations such as a star configuration, token ring configuration or other configurations. In some instances, the network 105 is any type of data network. For example, the network may be a 3G or 4G network. Furthermore, the network 105 may include a local area network (LAN), a wide area network (WAN) (e.g., the Internet), and/or any other interconnected data path across which multiple devices may communicate. In some instances, the network 105 may be a peer-to-peer network. The network 105 may also be coupled to or includes portions of a telecommunications network for sending data in a variety of different communication protocols. In some instances, the network 105 includes BLUETOOTH® communication networks or a cellular communications network for sending and receiving data such as via short messaging service (SMS), multimedia messaging service (MMS), hypertext transfer protocol (HTTP), direct data connection, WAP, email, etc. In some instances, the network 105 can be a combination of one or more of the different network types described above.

The alert system 199 can be code and routines for alerting a user that another user may be active on a social network application. In some instances, the alert system 199 can be implemented using hardware including a field-programmable gate array (FPGA) or an application-specific integrated circuit (ASIC). In some other instances, the alert system 199 can be implemented using a combination of hardware and software. In some instances, the alert system 199 may be stored in a combination on the devices and servers, or in one of the devices or servers. The alert system 199 is described below in more detail with reference to FIGS. 2-5.

Figure 2:
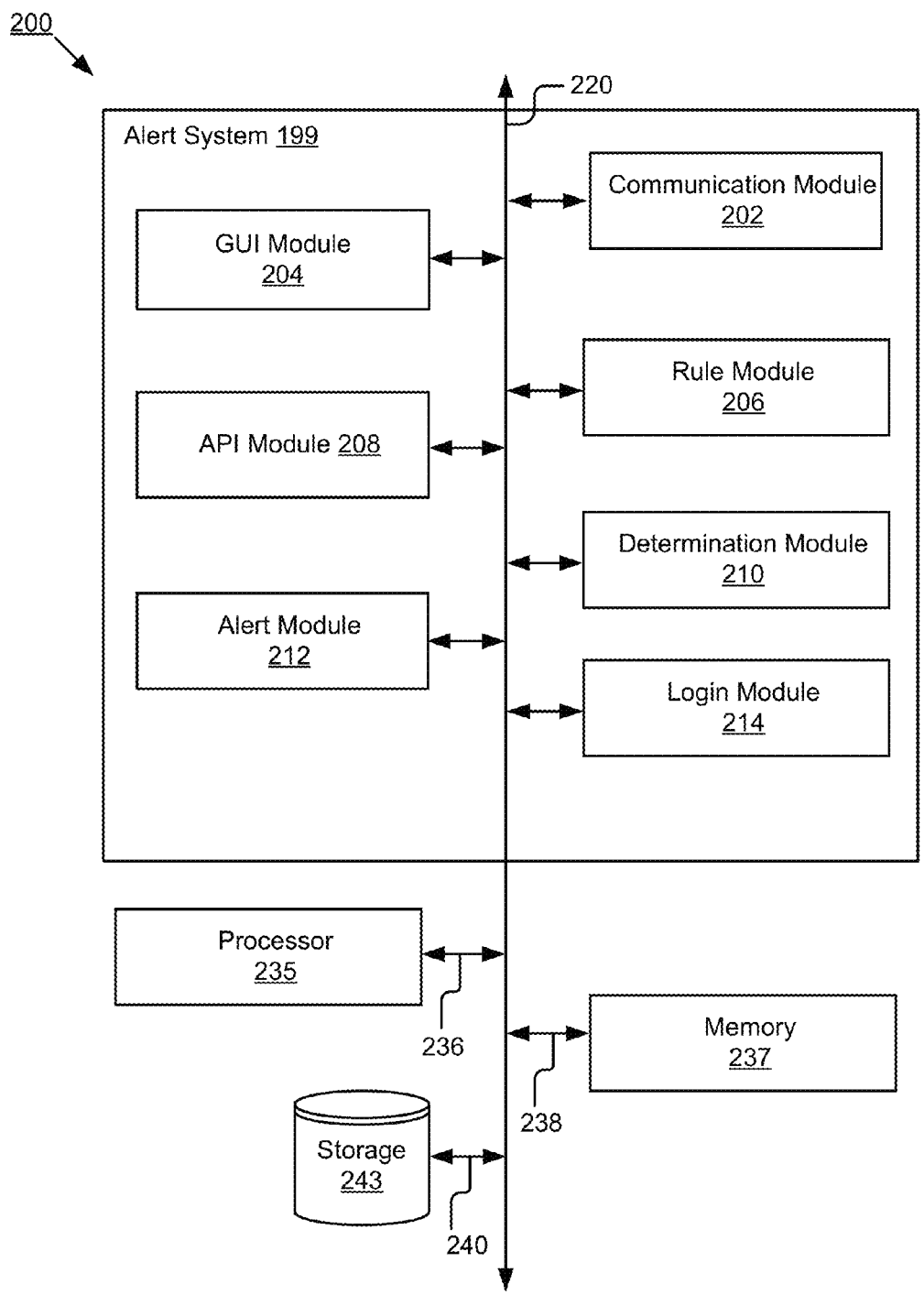
FIG. 2 is a block diagram illustrating an example of an alert system.

FIG. 2 is a block diagram illustrating an example of an alert system 199. FIG. 2 is a block diagram of a computing device 200 that includes: the alert system 199, a processor 235, a memory 237 and a storage 243. In some instances, the computing device 200 can be one of a social network server 101, a user device 115 and a third-party server 142.

The processor 235 includes an arithmetic logic unit, a microprocessor, a general purpose controller or some other processor array to perform computations and provide electronic display signals to a display device. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The instructions and/or data may include code for performing the techniques described herein. The memory 237 may be a dynamic random access memory (DRAM) device, a static random access memory (SRAM) device, flash memory or some other memory device. In some instances, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The storage 243 can be a non-transitory memory that stores data for providing the functionality described herein. The storage 243 may be a dynamic random access memory (DRAM) device, a static random access memory (SRAM) device, flash memory or some other memory devices. In some instances, the storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some instances, the storage 243 stores graphical data describing a user interface for receiving input from a user. In one example, the user interface may be a rule GUI for defining alert rules. In other instances, the graphical data may describe alert rules that a user 125 provided to the rule GUI.

In some instances, the storage 243 stores API data. In some instances, the API data may include an API for configuring communications between the alert system 199 and the social network application 109. For example, the API data may include a publicly available API for communicating with any social network application 109. In some instances, the API may provide a presence update for one or more users from a social network application 109. In some instances, the API may provide an interface for logging the user 125 in to the social network application 109. In some instances, the API data may include two or more APIs for communicating with two or more social network applications 109.

In some instances, the storage 243 stores rule data. The rule data is data that specifies one or more rules. An example of a rule is an alert rule. An alert rule may describe an alert preference for a first user 125. The alert rule may specify an alert type that describes a type of message that is transmitted to the user device 115. For example, a type of message can include an email message, an SMS message, an automated voice call, etc. The alert rules may specify a second user 125 and a social network application 109. The alert rules may describe two or more second users 125a . . . 125n and two or more alert types associated with the two or more second users 125a . . . 125n. In some instances, the alert types may be different for each second user 125.

In some instances, the alert rule may describe a login event option. A login event option is an optional event in which a user 125 is automatically logged-in to a social network application 109. An example of a login event option is described in more detail below with reference to steps 421 and 423 of FIG. 4C. In some instances, a user 125 may specify details regarding the login event option using a user interface depicted in FIG. 5. When the login event option is configured, login information for the user 125 may be retrieved from the storage 243. In some instances, the storage 243 stores the login information for the user 125. The login information can include login credentials for logging the user 125 in to social network application 109. For example, the login information can include a user name and a password for field input of a login page of the social network application 109. In another example, the login information can include an access token for accessing the social network application 109.

In some instances, the storage 243 stores user profile data. User profile data can include data describing the user preferences, interests, identifying information, etc. for a user 125. For example, the user profile is associated with the social network application 109. In some instances, the user profile data is associated with two or more social network applications 109. In one instance, the storage 243 stores an alert rule in the user profile for the user 125. In one instance, the alert rule describes a social network application 109 and the user profile may be associated with the social network application 109. In other instances, the alert rule describes the social network application 109 and the user profile may be associated with a different social network 109.

The alert system 199 includes: a communication module 202, a graphical user interface (GUI) module 204, a rule module 206, an application programming interface (API) module 208, a determination module 210, an alert module 212 and a login module 214. These components of the alert system 199 are communicatively coupled to each other via the bus 220.

The communication module 202 can be software including routines for handling communications between the alert system 199, other components of the computing device 200 and other entities of the system 100. In some instances, the communication module 202 can be a set of instructions executable by the processor 235 to provide the functionality described below for handling communications between the alert system 199, other components of the computing device 200 and other entities of the system 100. In some other instances, the communication module 202 can be stored in the memory 237 of the computing device 200 and can be accessible and executable by the processor 235.

The communication module 202 handles communication between the alert system 199, other components of the computing device 200 and other entities of the system 100. In one instance, the communication module 202 receives input requesting a rule GUI from the user 125. In another instance, the communication module 202 transmits an alert message to the user device 115. In some instances, the communication module 202 may be configured for sending and receiving data including via SMS, MMS, HTTP, direct data connection, WAP, email, etc. For example, the communication module 202 can transmit an SMS message to a user device 115.

The GUI module 204 can be software including routines for determining graphical data for causing the user device 115 to generate a GUI. In some instances, the GUI module 204 can be a set of instructions executable by the processor 235 to provide the functionality described below for determining graphical data that enables the user device 115 to generate a GUI. In some other instances, the GUI module 204 can be stored in the memory 237 of the computing device 200 and can be accessible and executable by the processor 235.

Figure 5:
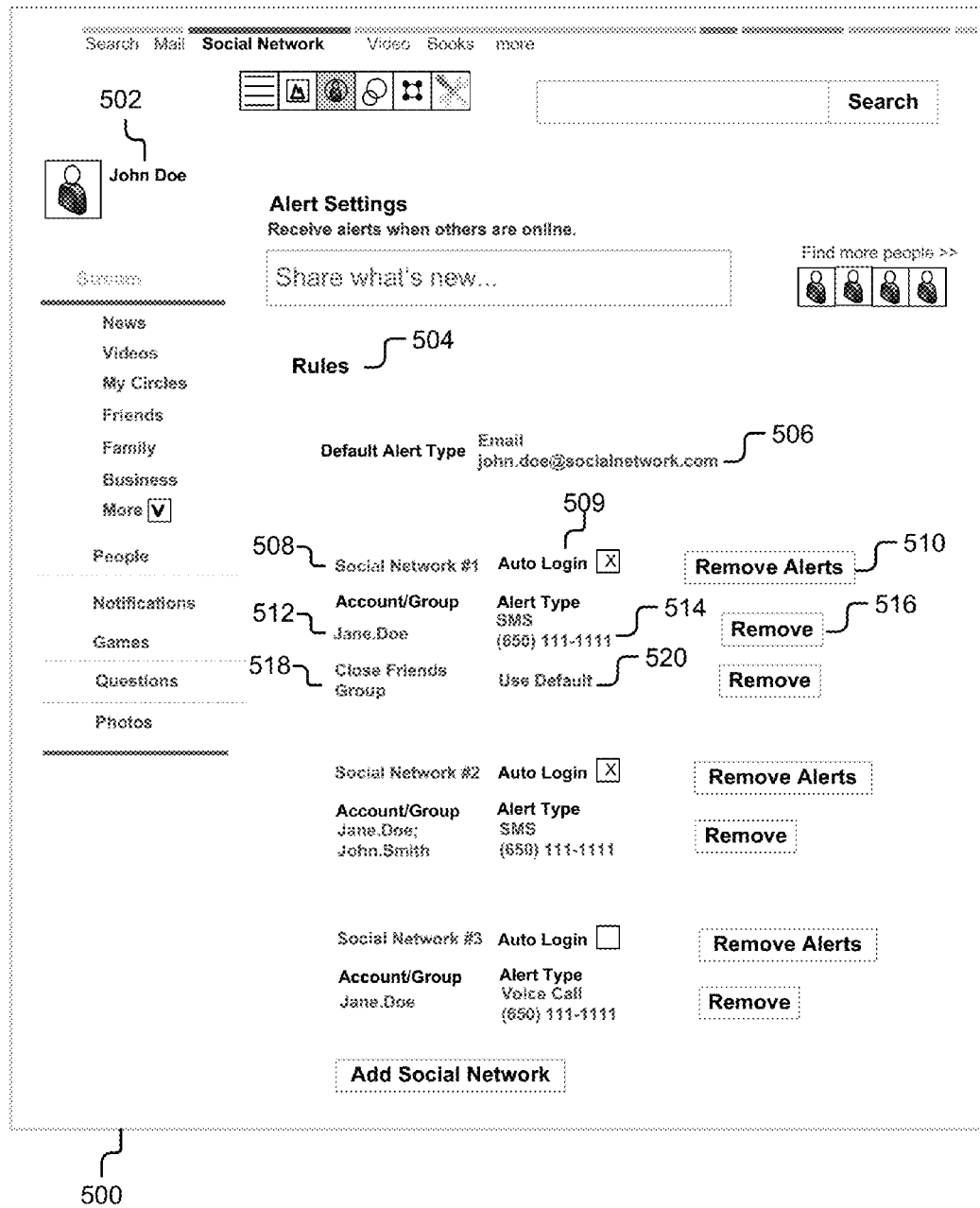
FIG. 5 is a graphic representation of an example user interface for alerting a first user that a second user may be active on a social network application.

In some instances, the GUI module 204 generates graphical data for displaying a rule GUI. In some instances, a rule GUI is a user interface used by the user 125 to provide rule data to the alert system 199. An example of a rule GUI is depicted in FIG. 5. The GUI module 204 may transmit the graphical data to the communication module 202. The communication module 202 may transmit the graphical data to the user device 115. For example, the communication module 202 may transmit the graphical data to the user device 115 via the network 105. The user device 115 may generate a rule GUI for display to the user 125 based at least in part on the graphical data determined by the GUI module 204. For example, the user device 115 stores a browser application on a non-transitory memory (not pictured) of the user device 115. The user device 115 includes a processor (not pictured) that executes the browser application. The browser application executes the browser and renders a rule GUI based at least in part on the graphical data. An example of a rule GUI is described below with reference to FIG. 5. The user 125 may configure an alert rule via the rule GUI. The GUI module 204 may determine graphical data for generating other user interfaces for display on user device 115.

In some instances, the alert system 199 may be an element of the user device 115. For example, the user device 115 may be a mobile device such as a smart phone or tablet computer. The alert system 199 may be an application stored on a non-transitory memory of the user device 115. The GUI module 204 may determine a rule GUI for display on the user device 115. In some instances, GUI module 204 can determine the rule GUI based on the input requesting the rule GUI. In some instances, the GUI module 204 may retrieve graphical data from the storage 243 for providing the rule GUI to the user device 115 to present the rule GUI. The user 125 may configure an alert rule via the rule GUI.

The rule module 206 can be software including routines for managing alert rules. In some instances, the rule module 206 can be a set of instructions executable by the processor 235 to provide the functionality described below for managing alert rules. In some other instances, the rule module 206 can be stored in the memory 237 of the computing device 200 and can be accessible and executable by the processor 235.

The rule module 206 can manage and store alert rules. In one instance, the rule module 206 receives rule input specifying an alert rule. In some instances, the rule module 206 receives the rule input provided by user 125 in a rule GUI. For example, the rule GUI may be a user interface depicted in FIG. 5. The user 125 inputs data in the fields of the rule GUI. The data received via the rule GUI can be rule data specifying one or more alert rules. The communication module 202 receives the data and stores it in the storage 243 (or the memory 237). In some instances, an alert rule specifies alert preferences for alerting a user 125. For example, the alert rule specifies a type of message for transmitting to the user device 115. In some instances, an alert rule specifies one or more social network applications 109 used by the user 125. In some instances, the alert rule specifies two or more second users 125a . . . 125n.

In some instances, the alert rule specifies a group on the social network. For example, the user 125 wants to be notified when any members of a group of students taking the same class are active so that they can discuss a homework problem. In some instances, the alert rule distinguishes between general members of the group and certain users within the group. For example, the alert rule specifies notifying the user 125 when members of the group with a first-degree relationship with the user become active via an email that is sent within a minute of those members becoming active. For the other members of the group, the alert rule specifies sending an hourly summary to the user 125 of members that became active.

In other instances, the rule module 206 may store the alert rule. For example, the rule module 206 may store the alert rule in storage 243. In some instances, the rule module 206 may store the alert rule in a user profile of the social network application 109. For example, the alert rule is stored in the user profile for the user 125. User profile data can include data describing the user profile for a user 125. For example, the user profile is associated with the social network application 109. In some instances, the alert rule may describe a social network application 109 and the user profile may be associated with the social network application 109. In other instances, the alert rule may describe the social network application 109 and the user profile may be associated with a different social network application 109. In some instances, the rule module 206 stores in the storage 253 an association between one or more alert rules and the user profile for the user 125.

The API module 208 can be software including routines for determining an API. In some instances, the API module 208 can be a set of instructions executable by the processor 235 to provide the functionality described below for determining an API. In some other instances, the API module 208 can be stored in the memory 237 of the computing device 200 and can be accessible and executable by the processor 235.

The social network application 109 uses an API to determine what information to provide to the alert system 199. The API module 208 can determine the API so that the communication module 202 can communicate and exchange data with the social network application 109. For example, the API module 208 determines how to configure requests for data depending on the type of social network application 109. In some instances, the API module 208 may determine the API based on the social network application 109 specified by an alert rule. For example, the API module 208 may determine the API based on comparing the social network application 109 specified by the alert rule with API data stored in the storage 243. The API data may include a publicly available API for communicating with any social network application 109. In some instances, the API data may include two or more APIs for communicating with two or more social network applications 109.

In some instances, the API module 208 may determine which API to retrieve from the storage 243 based at least in part on a social network specified by an alert rule. For example, the API is a publicly available API for communicating with the social network application 109. in some instances, the storage 243 stores an association between the API and the particular social network application 109. The storage 243 may store other APIs not associated with the social network application 109.

The alert rule specifies a particular social network application 109 that the first user 125a is interested in. The API module 208 determines that the alert rule specifies a particular social network application 109. The API module 208 determines which API stored on the storage 243 is associated with the particular social network application 109 specified by the alert rule. The API module 208 retrieves the API stored on the storage 243 that is associated with the social network application specified by the alert rule.

The determination module 210 can be software including routines for determining whether a user 125 is active on a social network application 109. In some instances, the determination module 210 can be a set of instructions executable by the processor 235 to provide the functionality described below for determining whether a user 125 may be active on a social network application 109. In some other instances, the determination module 210 can be stored in the memory 237 of the computing device 200 and can be accessible and executable by the processor 235.

In one instance, the determination module 210 may receive a presence update from the social network application 109 based on the API. For example, the determination module 210 cooperates with the communication module 202 to request a presence update from the social network application 109 using an API determined by the API module 208. In some instances, the determination module 210 uses a call function of the API to request a presence update from the social network application 109. A presence update is data provided by the social network application 109 to the alert system 199 that describes whether a second user 125n is presently active on the social network (e.g., whether the user 125 is online). For example, a second user 125n is active on a social network application 109 when the second user 125n is logged into the social network application 109. In some instances, the user 125 is a second user 125n specified by an alert rule by a first user 125a.

The determination module 210 can determine an alert event responsive to determining that a second user 125n specified by an alert rule is online. An alert event is an event describing when a second user 125n specified by an alert rule is online. For example, a first user 125a uses a rule GUI to specify an alert rule requesting to be notified when a second user 125n or a group of users are online. The alert rule also specifies one or more social network applications 109 to communicate with regarding the presence of the second user 125n. The API module 208 determines one or more APIs for communicating with the social network applications 109 specified by the alert rule. The communication module 202 receives presence update data describing whether the second user 125n is logged in the social network application 109 specified by the alert rule. Responsive to receiving a presence update indicating that the second user 125n is logged in, the determination module 210 determines an alert event. The determination module 210 then communicates the alert event to the alert module 212.

The determination module 210 may receive the presence update in different formats. For example, the format may include Extensible Markup Language (XML). The format may include JavaScript Object Notation (JSON). The format may include Comma-Separated Values (CSV) format. The presence update may describe whether a second user 125 is active on the social network application 109. In some instances, the presence update includes a status for the second user 125. For example, the status describes an online status for the second user 125 on the social network application 109 (e.g. available, unavailable, busy, on a call, available but idle, etc.). The status may describe the second user 125 as online or offline. In other instances, the presence update may include an activity timestamp. The activity timestamp may describe an action by the second user 125 on the social network application 109 at a particular time. For example, the action may include posting, logging in, logging out, commenting, providing indications of acknowledgement, chatting, emailing, etc. In some instances, the determination module 210 uses the status to determine the presence update unless the determination module 210 determines that the user has configured the social network to indicate that the user is perpetually offline. In instances where the user consents to the use of such data, the determination module 210 can rely on the activity timestamp to determine whether the user is present. For example, a user that has posted or commented in the last minute is probably online even though the user's status is listed as offline.

In some instances, the determination module 210 determines whether the second user 125 may be active on the social network application 109 based on the presence update. For example, the determination module 210 makes the determination based on the status. In instances where the second user 125 consents to the use of such data, the determination module 210 makes the determination based on the activity timestamp. For example, the determination module 210 makes the determination based on a recency of a particular action by the second user 125 on the social network application 109 during a fixed period of time (e.g. activity within the last minute, five minutes, 10 minutes, etc.).

In some instances, the determination module 210 determines that the second user 125 is not active on the social network application 109. In response to determining that the second user 125 is not be active on the social network application 109, the determination module 210 may receive another presence update from the social network application 109. For example, determination module 210 requests the presence update with a call function to the social network application 109 using the API. The determination module 210 can determine whether the second user 125 may be active on the social network application 109 based on the presence update.

The alert module 212 can be software including routines for determining alert types. In some instances, the alert module 212 can be a set of instructions executable by the processor 235 to provide the functionality described below for determining alert types. In some other instances, the alert module 212 can be stored in the memory 237 of the computing device 200 and can be accessible and executable by the processor 235.

In some instances, the alert module 212 determines an alert type based on the alert rule. For example, the alert rule specifies that the first user 125a wants to be notified that a second user 125n is online responsive to the determination module 210 determining an alert event. In some instances, the alert rule specifies different levels of alerts depending upon the relationship between users. For example, the first user 125a specifies that the alert event should occur for other users with a first-degree relationship with the first user. In another example, the first user 125a specifies that the alert level should be a notification in the social network for users in a specific group unless those users have an affinity score with the user that exceeds a certain threshold, in which case the alert level should be a text message. In yet another example, the first user 125a wants to see alert events for users with a certain level of closeness, for example, users that are close friends and not users that are acquaintances.

The alert rule may further specify that the first user 125a wants to be notified using a particular type of messaging. For example, the alert rule specifies that the first user 125a wants to be notified of the second user's 125n presence online via email, SMS, a notification within a social network or any other messaging type. The alert rule 212 determines the alert type based on the messaging type specified by the alert rule. In some instances, the alert rule includes designating a type of messaging based on the relationship between the users. For example, a first user 125a wants to receive SMS messages when users that exceed a certain affinity score are present online and the user 125a wants to receive email messages when users with a lower affinity score than the threshold are present online.

The alert module 212 may generate an alert message based on the messaging type. The alert module 212 may transmit the alert message to the communication module 202 responsive to the determination module 210 determining an alert event. The communication module 202 may transmit the alert message to the user device 115. For example, the communication module 202 may transmit the alert message to the user device 115 via the network 105.

The login module 214 can be software including routines for managing logins for the user 125. In some instances, the login module 214 can be a set of instructions executable by the processor 235 to provide the functionality described below for managing logins for the user. In some other instances, the login module 214 can be stored in the memory 237 of the computing device 200 and can be accessible and executable by the processor 235.

In some instances, the login module 214 may log the user 125 in the social network application 109 in response to the determination module 210 determining an alert event. For example, the determination module 210 determines an alert event in response to a presence update indicating that the second user 125 may be active on the social network application 109. The login module 214 may determine whether a login event occurs based on the alert rule. For example, the alert rule may include a login event option specified by the first user 125a. The login event option indicates that the first user 125a wants to be automatically logged-in to the social network application 109 responsive to the determination module 210 determining an alert event. For example, the first user 125a is logged-in to the same social network 109 on which the second user 125n is presently active.

In some instances, the login module 214 retrieves login information for the user 125. In some instances, the login module 214 retrieves the login information based on the login event option being configured by the user 125. For example, the user 125 may specify the login event option using a user interface depicted in FIG. 5. In some instances, the login module 214 retrieves login credentials from storage 243. The login module 214 may transmit the login credentials to the social network application 109. The social network application 109 provides access based on the login credentials. In some instances, the login module 214 retrieves a username and a password for logging the user 125 into the social network application 109. The login module 214 may input the username and password in fields of a login page for submission to the social network application 109. In other instances, the login module 214 provides the login credentials to the social network application 109 using the API based on the social network application 109 specified by the alert rule.

Figure 3:
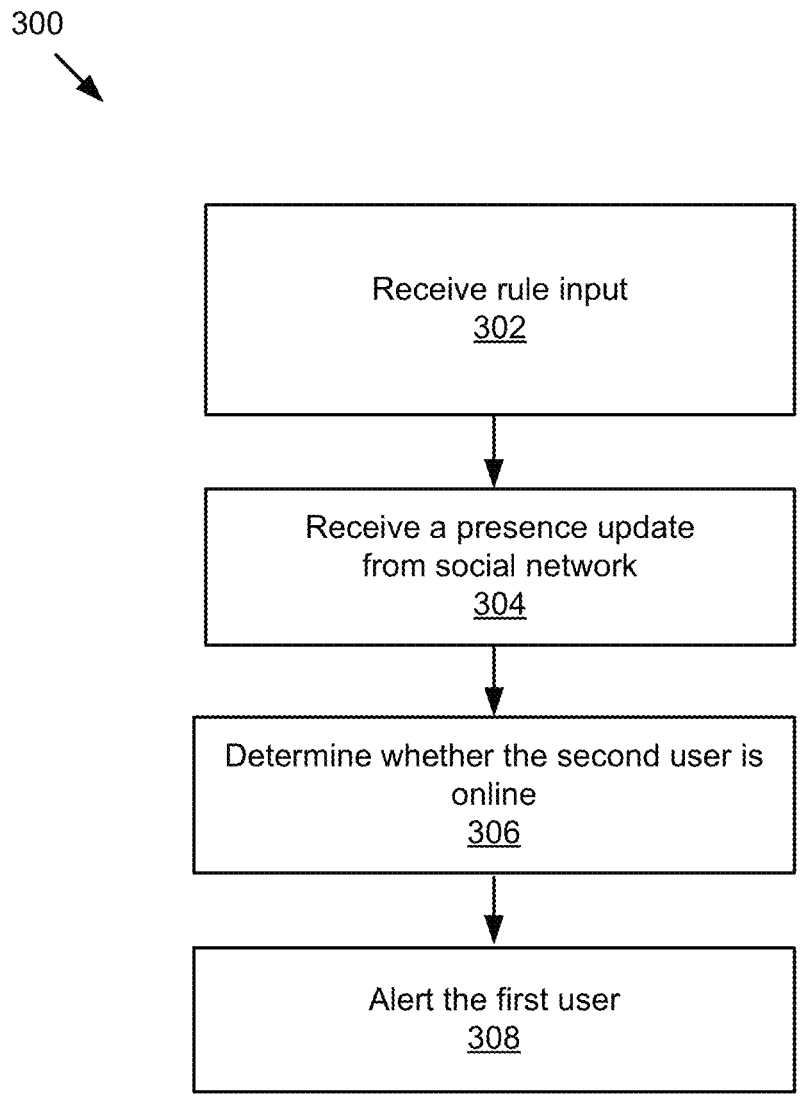
FIG. 3 is a flowchart of an example method for alerting a first user that a second user may be active on a social network application.

Referring now to FIG. 3, a flowchart of method 300 for alerting a first user 125a that a second user 125n may be active on a social network application 109 is described. The alert system 199 includes a communication module 202, a rule module 206 and a determination module 210. The rule module 206 receives 302 a rule input. The rule input may specify an alert rule. For example, a first user 125a specifies that the user wants to see an SMS message when a second user is present on a social network 109. The determination module 210 receives 304 a presence update from the social network application 109. For example, the determination module 210 receives information about a second user that commented on the social network application 109 in the last 30 seconds. The determination module 210 determines 306 whether the second user 125n is online. In some instances, the determination module 210 may determine whether the second user 125n is active on the social network application 109. The communication module 202 alerts 308 the first user 125a that the second user 125n is online. In some instances, the communication module 202 may alert the first user 125a by transmitting an alert message to a user device 115. In some instances, the type of message can be an SMS message, an email message, an automated voice call, a notification in a social network, etc.

Figure 4A:
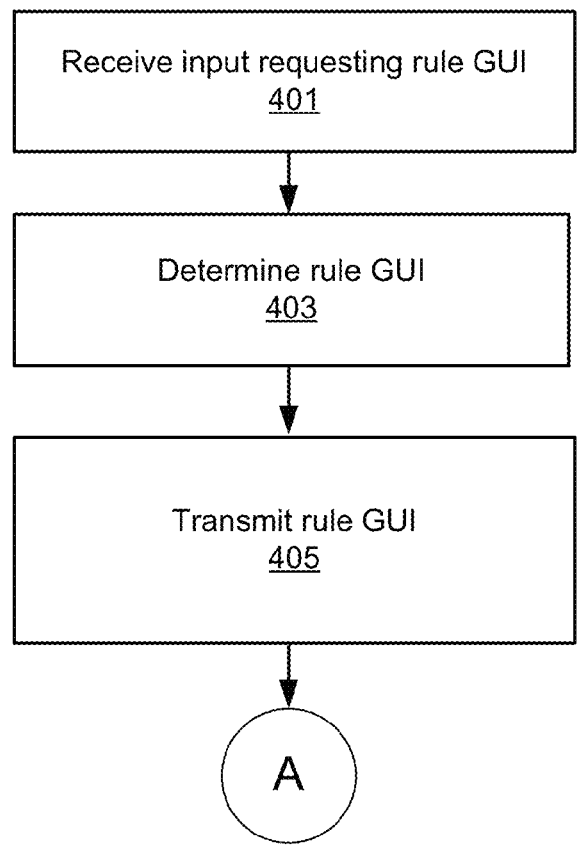
FIGS. 4A-4C are flowcharts of another example method for alerting a first user that a second user may be active on a social network application.
Figure 4B:
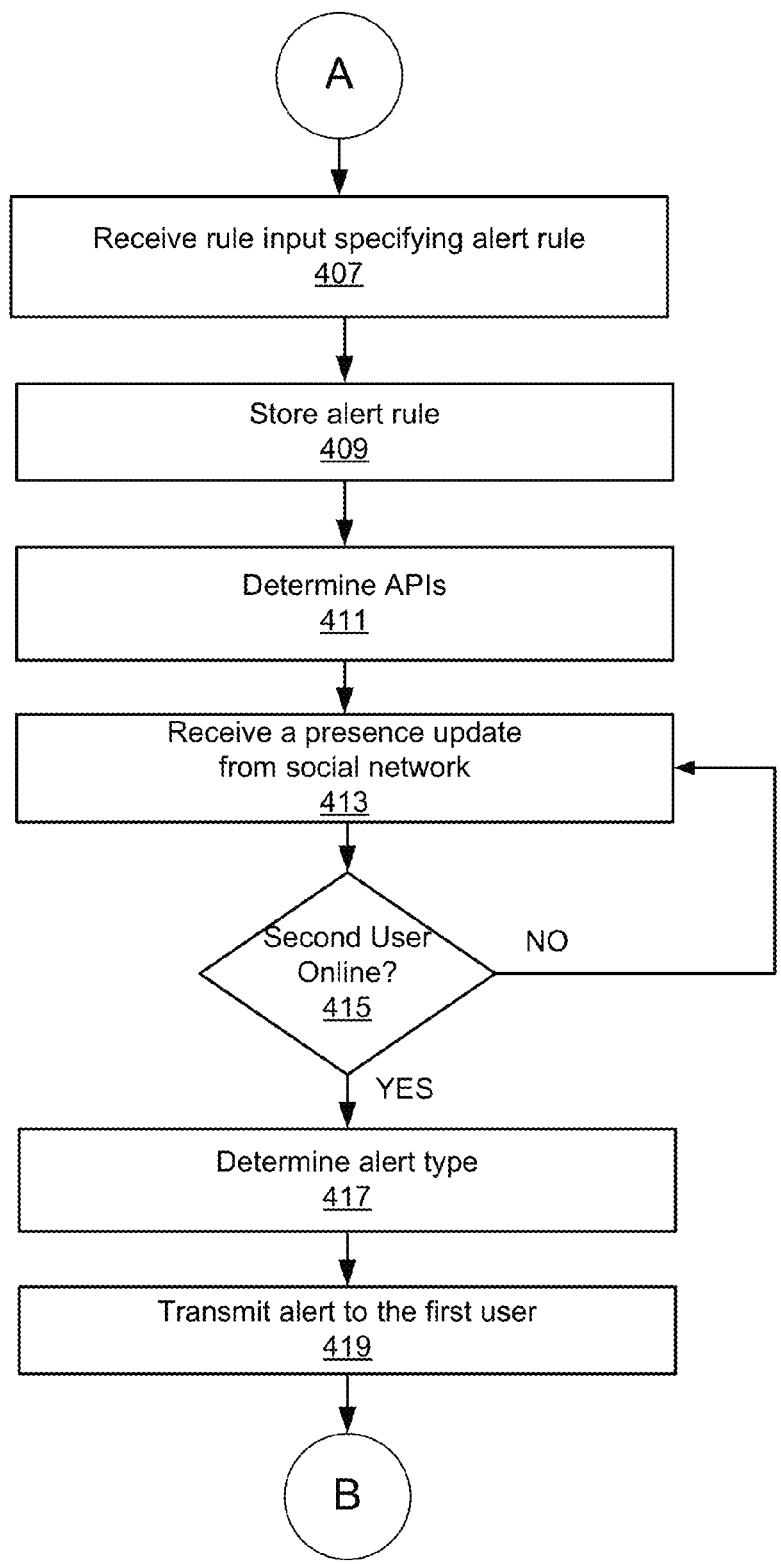
Figure 4C:
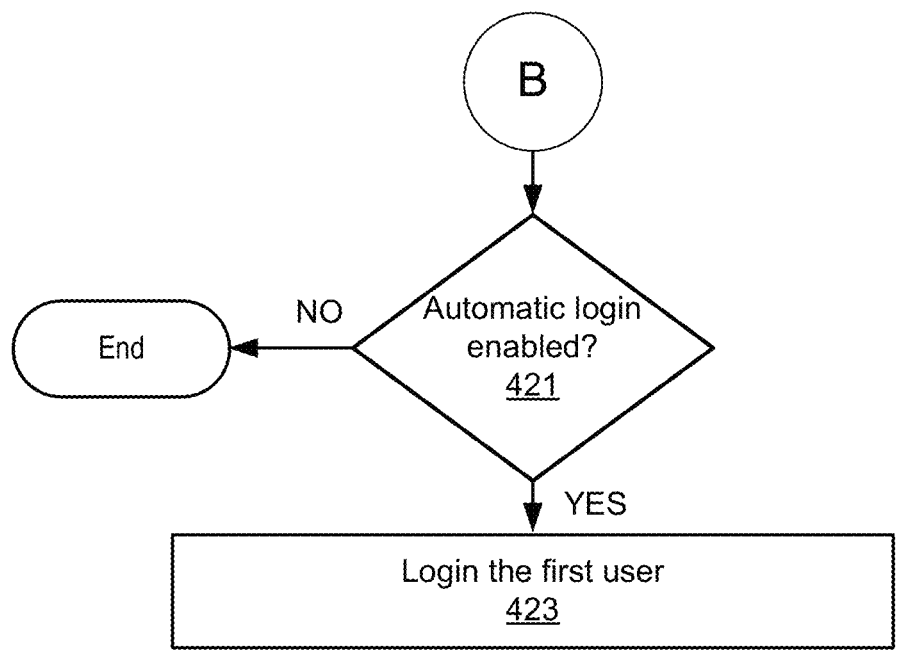

Referring now to FIGS. 4A-4C, flowcharts of another method 400 for alerting a first user 125a that a second user 125n is active on a social network application 109 are described. The alert system 199 includes a communication module, a GUI module 204, a rule module 206, a determination module 210 and a login module 214. Turning to FIG. 4A, the communication module 202 receives 401 input requesting a rule GUI. The GUI module 204 determines 403 the rule GUI. The GUI module 204 transmits 405 the rule GUI.

Referring to FIG. 4B, the rule module 206 receives 407 one or more rule inputs specifying an alert rule. The rule module 206 may store 409 the alert rule in a user profile. The API module 208 determines 411 one or more APIs. For example, the API module 208 determines how to communicate with social networks using a public API or an API that is specific to each social network. The determination module 210 receives 413 a presence update from the social network application 109. At step 415, the determination module 210 determines whether the second user 125n is online. For example, the determination module 210 determines that the second user's status switched from unavailable to available. In another example, the determination module 210 determines that the second user performed an activity recently, for example, the user posted in a social network. If the determination module 210 determines that the second user 125n is not online, the method 400 may move to step 413. Otherwise, the determination module 210 determines 417 an alert type. For example, the determination module 210 determines that the first user prefers to receive an SMS when the second user is online because the first user follows the second user. The communication module 202 may transmit 419 an alert to the first user 125a.

Referring to FIG. 4C, at step 421, the login module 214 can determine whether automatic login is enabled. If the login module 214 determines that automatic login is enabled, the method 400 moves to step 423. At step 423, the login module 214 may login the first user 125a. Otherwise, the method 400 ends.

In some instances, at least a part of the alert system 199 may be stored and executed by a user device 115. For example, the user device 115 is a mobile device such as a smart phone and the alert system 199 is an application stored and executed by the mobile device. In some instances, the alert system 199 can perform at least some of the steps of the method 400, while other steps of method 400 are performed by the social network application 109 or any other system associated with the social network server 101. For example, the alert system 199 may receive 410 one or more inputs requesting a rule GUI. The alert system 199 may determine 403 the rule GUI. The alert system 199 may transmit 405 the rule GUI. In other instances, the alert system 199 may determine 421 whether the social network is configured for automatic login. The user device 115 may login the first user 125a into the social network if it is configured for automatic login. A person having ordinary skill in the art will appreciate that in some embodiments the alert system 199 stored on the user device 115 performs different steps of method 400.

FIG. 5 is a graphic representation 500 of an example user interface for alerting a first user 125a that a second user 125n is active on a social network application 109. In the illustrated implementation, the user interface includes alert settings for alerting the first user 125 when a second user 125n is active on a social network application 109. The user interface includes an identifier 502 that identifies the alert settings for a first user 125 named "John Doe." The alert settings may include input for defining alert rules 504. The alert rules include a default alert type 506 for alerting the first user 125a. The alert type 506 includes a type of message and an identifier for sending the message. For example, the type of message can be an email and the identifier may be an email address. The default alert type 506 is a default option for associating an alert type with a second user 125n.

The alert rules 504 applies to one or more social network applications 109 for determining whether a second user 125n may be active on the social network application 109. Social network name 508 identifies a social network application 109 as "Social Network #1." The second user 125n may be identified by a username 512 or group name 518. In one instance, the alert types associated with the second user 125n are different. For example, the alert type 514 associated with the second user 125n identified by username 512 may be an SMS type of message. The alert type 514 may include an identifier or phone number for sending the message. The alert type 520 associated with the group name 518 may be a default alert type that may be based on the default alert type 506.

The user interface includes a remove button 516 for removing an alert rule for a second user 125n. The user interface includes a remove alerts button 510 for removing alerts for all second users 125 for a social network application 109. For example, by clicking on remove alerts button 510, alerts for "Jane.Doe" and "Close Friends Group" on "Social Network #1" may be removed or deleted.

The rules may include an automatic login input 509. The automatic login input 509 may be a login event option described in FIG. 2. When the automatic login input 509 is activated, login information for the first user 125a may be retrieved. The first user 125a may be logged in the social network application 109 in response to an alert event.

In the above description, for purposes of explanation, numerous specific details are set forth in order to provide a thorough understanding of the specification. It will be apparent, however, to one skilled in the art that the disclosure can be practiced without these specific details. In other instances, structures and devices are shown in block diagram form in order to avoid obscuring the description. For example, the disclosure is described in one instance primarily with reference to user interfaces and particular hardware. However, the disclosure applies to any type of computing device that can receive data and commands, and any peripheral devices providing services.

Reference in the specification to "one instance" or "an instance" means that a particular feature, structure, or characteristic described in connection with the instance is included in at least one instance of the description. The appearances of the phrase "in one instance" in various places in the specification are not necessarily all referring to the same instance.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred instance, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors, an alert rule from a first user describing a second user and a social network application associated with the second user, the alert rule specifying different levels of alert based on an affinity score of the second user;
   determining, with the one or more processors, an application programming interface based on the alert rule;
   receiving a presence update from the social network application based on the application programming interface, the presence update describing whether the second user is active on the social network application;
   determining, with the one or more processors, whether the second user is active on the social network application and the affinity score of the second user based on frequency of communication between the first user and the second user;
   determining, with the one or more processors, an alert event responsive to determining that the second user is active on the social network application and a level of alert associated with the alert rule; and
   transmitting an alert message to the first user responsive to the alert event.

2. The method of claim 1, further comprising:
   determining whether a login event is configured based on the alert rule;
   retrieving login information for the first user; and
   logging the first user into the social network application responsive to the alert event.

3. The method of claim 1, wherein the alert rule is for a group in the social network and the second user is part of the group.

4. The method of claim 1, wherein the alert rule describes two or more second users and two or more alert types associated with the two or more second users.

5. The method of claim 4, wherein the alert types are different for each second user.

6. The method of claim 1, wherein determining whether the second user is active is based on a recency of the second user performing an activity in the social network during a fixed period of time.

7. The method of claim 1, wherein the alert rule applies different alert types based on a threshold affinity score for the second user.

8. A system comprising:
   one or more processors; and
   a memory storing instructions that, when executed, cause the system to:
   receive an alert rule from a first user describing a second user and a social network application associated with the second user, the alert rule specifying different levels of alert based on an affinity score of the second user;
   determine an application programming interface based on the alert rule;
   receive a presence update from the social network application based on the application programming interface, the presence update describing whether the second user is active on the social network application;
   determine whether the second user is active on the social network application and the affinity score of the second user based on frequency of communication between the first user and the second user;
   determine an alert event responsive to determining that the second user is active on the social network application and a level of alert associated with the alert rule; and
   transmitting an alert message to the first user responsive to the alert event.

9. The system of claim 8, wherein the instructions are further configured to cause the system to:
   determine whether a login event is configured based on the alert rule;
   retrieve login information for the first user; and
   log the first user into the social network application responsive to the alert event.

10. The system of claim 8, wherein the alert rule is for a group in the social network and the second user is part of the group.

11. The system of claim 8, wherein the alert rule describes two or more second users and two or more alert types associated with the two or more second users.

12. The system of claim 11, wherein the alert types are different for each second user.

13. The system of claim 8, wherein determining whether the second user is active is based on a recency of the second user performing an activity in the social network during a fixed period of time.

14. The system of claim 8, wherein the alert rule applies different alert types based on a threshold affinity score for the second user.

15. A computer program product comprising a non-transitory computer usable medium including a computer readable program, wherein the computer readable program when executed on a computer causes the computer to:
   receive an alert rule from a first user describing a second user and a social network application associated with the second user, the alert rule specifying different levels of alert based on an affinity score of the second user;
   determine an application programming interface based on the alert rule;
   receive a presence update from the social network application based on the application programming interface, the presence update describing whether the second user is active on the social network application;
   determine whether the second user is active on the social network application and the affinity score of the second user based on frequency of communication between the first user and the second user;
   determine an alert event responsive to determining that the second user is active on the social network application and a level of alert associated with the alert rule; and
   transmit an alert message to the first user responsive to the alert event.

16. The computer program product of claim 15, wherein the computer readable program when executed on the computer causes the computer to also:
   determine whether a login event is configured based on the alert rule;
   retrieve login information for the first user; and
   log the first user into the social network application responsive to the alert event.

17. The computer program product of claim 15, wherein the alert rule is for a group in the social network and the user is part of the group.

18. The computer program product of claim 15, wherein the alert rule describes two or more second users and two or more alert types associated with the two or more second users.

19. The computer program product of claim 18, wherein determining whether the second user is active is based on a recency of the second user performing an activity in the social network during a fixed period of time.

20. The computer program product of claim 15, wherein the alert rule applies different alert types based on a threshold affinity score for the second user.

* * * * *